(12) United States Patent
Icaza Acereto

(10) Patent No.: US 6,568,870 B2
(45) Date of Patent: May 27, 2003

(54) STEERING TIE ROD END

(75) Inventor: Juan Jose Icaza Acereto, Estado de Mexico (MX)

(73) Assignee: Urresko, S.A. de C.V., Tepotzotlan (MX)

( * ) Notice: Subject to any disclaimer, the term of this patent is extended or adjusted under 35 U.S.C. 154(b) by 0 days.

(21) Appl. No.: 09/923,403

(22) Filed: Aug. 8, 2001

(65) Prior Publication Data

US 2003/0031506 A1 Feb. 13, 2003

(51) Int. Cl.[7] ................................................. F16C 11/06
(52) U.S. Cl. ........................................ 403/135; 403/122
(58) Field of Search ................................. 403/122, 124, 403/132, 133, 138, 135, 140, 149, 141.144; 29/283.5, 441.1, 446, 522.1, 898.051; 464/118; 280/93.511

(56) References Cited

U.S. PATENT DOCUMENTS

| | | | |
|---|---|---|---|
| 923,045 A | * 5/1909 | Gulick | 280/124.165 |
| 1,462,859 A | 7/1923 | Huestis | 156/349 |
| 1,643,720 A | * 9/1927 | McKone | 92/187 |
| 3,004,786 A | * 10/1961 | Herbenar | 403/135 |
| 4,028,784 A | 6/1977 | Allison | 29/898.051 |
| 4,059,361 A | 11/1977 | Allison | 403/77 |
| 4,318,335 A | * 3/1982 | Wiegand et al. | 91/369.2 |
| 5,066,160 A | 11/1991 | Wood | 403/140 |
| 6,042,294 A | * 3/2000 | Urbach | 403/135 |
| 6,422,779 B1 | * 7/2002 | Spagnuolo | 403/138 |

FOREIGN PATENT DOCUMENTS

| | | | |
|---|---|---|---|
| DE | 37 42 084 A1 | * 6/1989 | 180/336 |
| JP | 361248920 A | * 11/1986 | 464/137 |
| JP | 40817632 A | * 7/1996 | |

* cited by examiner

Primary Examiner—Robert J. Sandy
Assistant Examiner—Ruth C. Rodriguez
(74) Attorney, Agent, or Firm—Stevens, Davis, Miller & Mosher, L.L.P.

(57) ABSTRACT

Tie rod end for a steering system that comprises a crosslink axis and a stud; the crosslink axis has on one of its ends a box portion for coupling with the stud, the box has two recesses perpendicular, the recesses form two housings shaped as half-cubes in which the bearings are housed; the recesses being of greater dimensions widthwise relative the bearings, so they allow the bearings to move with an oscillating motion.

1 Claim, 4 Drawing Sheets

STEERING TIE ROD END

BACKGROUND OF THE INVENTION

Tie rod ends for steering systems of motor vehicles are already known. The patent of the U.S. Pat. No. 4,028,784, granted on Jun. 14, 1977, to William D. Allison, entitled "Preloaded Tie Rod End Assembly" (Pre loaded tie rod end structure); the patent of the U.S. Pat. No. 4,059,361, granted on Nov. 22, 1977 to William D. Allison, entitled "Tie Rod End"; the patent of the U.S. Pat. No. 4,162,859, granted on Jul. 31, 1979, to Lloyd O. McAfee entitled "Vehicle Steering Knuckle Arm Angle Compensator," and the patent of the U.S. Pat. No. 5,066,160, granted on Nov. 19, 1991, to Lloyd O. McAfee, entitled "Ball Joint" (spherical articulation) as sample patents. None of these patents address the problem which this invention solves.

It is known that vibration affects tie rod ends and that it is transmitted to the tube. In some extreme cases, it provokes the tie rod assembly to fracture. General specifications for tie rod ends exist (e.SAE J193) and most of the current systems meet them. However, fractures of the tie rod assemblies have been reported recently and their catastrophic consequences make imperious the necessity to solve this problem, and there are no existing references that outline an intent to solve it. These fractures are the result of vibrations whose causes have not been clearly determined, but may be related to braking, suspension systems or road conditions. However, the present invention has the objective of absorbing these vibrations to avoid the fractures of the tie rod assemblies.

BRIEF DESCRIPTION OF THE INVENTION

In accordance with this, the present invention provides means to absorb or to reduce in a significant way, the vibrations in all directions.

BRIEF DESCRIPTION OF THE DRAWINGS

The novel characteristic of this invention, as well as the invention itself, both in structure and operation, will be understood from the following attached drawings taken in connection with the following description thereof, where like reference characters refer to like parts and wherein.

DETAILED DESCRIPTION OF THE PREFERRED EMBODIMENT

Figure 1:
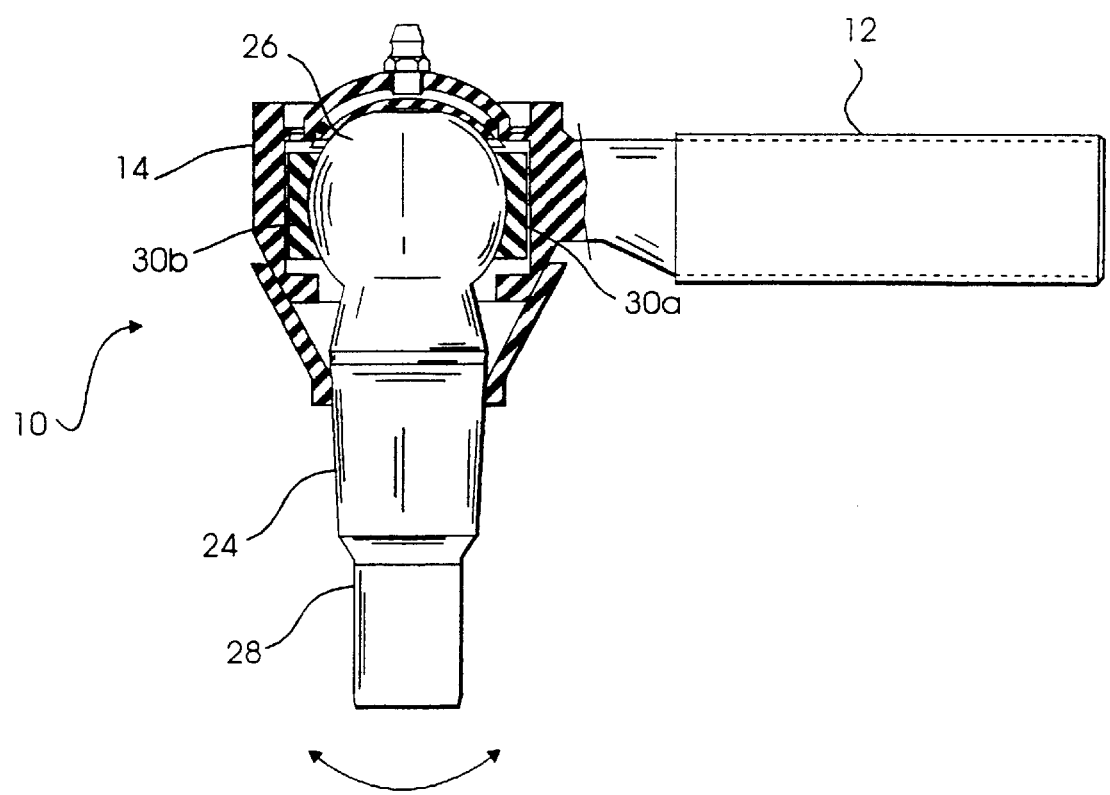
FIG. 1 is a partially cut side view of the novel tie rod end.

Always referring to drawings, where the present preferred embodiment of the invention is shown:

FIG. 1 shows the tie rod end (10), which is formed by a crosslink axis (12) and a stud (24), said stud presents on its top a ball (26) which serves for the coupling with the crosslink axis (12); the stud, in the lower part, ends with a minor diameter (28).

Figure 2:
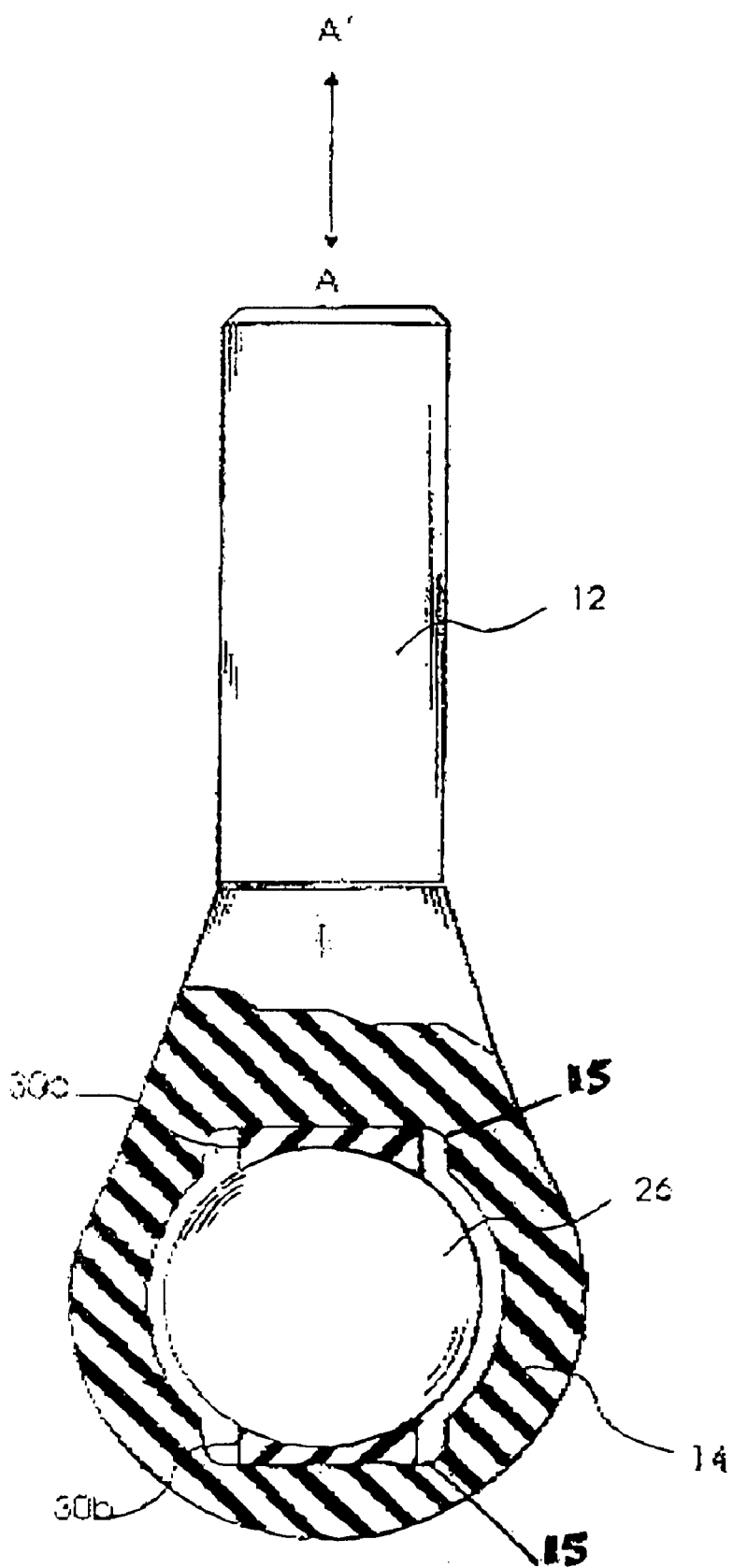
FIG. 2 is a partially cut top plan view of the tie rod end.

FIG. 2 shows the crosslink axis (12) which presents on one of its ends a box portion (14) for coupling with the stud (24); the box (14) has two recesses (15) perpendicular relative to axis A–A', said recesses (15) form two housings in the shape of half cubes, in which bearings (30a, 30b) are housed; said bearings being of cubic shape, one of their faces is hemi-spherical.

Figure 3:
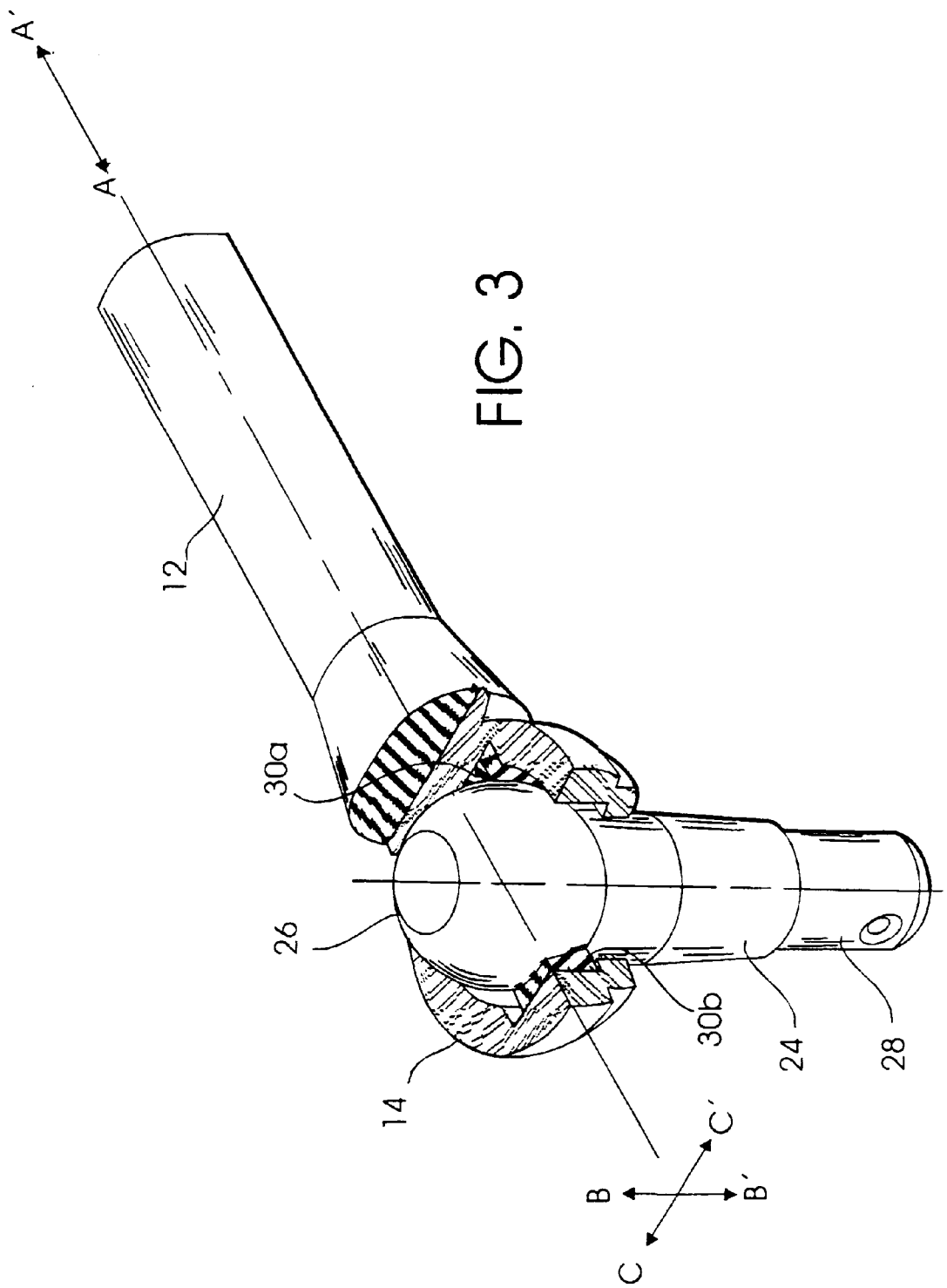
FIG. 3 is a partially cut top perspective view of the tie rod end of the present invention.

FIG. 3 shows the coupling of the stud (24) with crosslink axis (12), said coupling is realized by placing the bearings (30a and 30b) in the recesses (15) of the box (14); these recesses being of larger dimensions in width, relative to bearings (30a and 30b), so they allow the bearings (30a and 30b) to move relative the axis B–B' and C–C'. Once the bearings (30a and 30b) are placed in the recesses (15), the stud (24) ball (26) is connected with the hemi-spherical faces of bearings (30a and 30b). A–A', B–B', and C–C' are orthogonal.

The bearings (30a and 30b) are of a thickness greater than the recesses (15) depth, so they allow the stud (24) ball (26) to remain in a concentric way pattern the box (14) portion, without touching any part of the box portion (14) walls.

Figure 4:
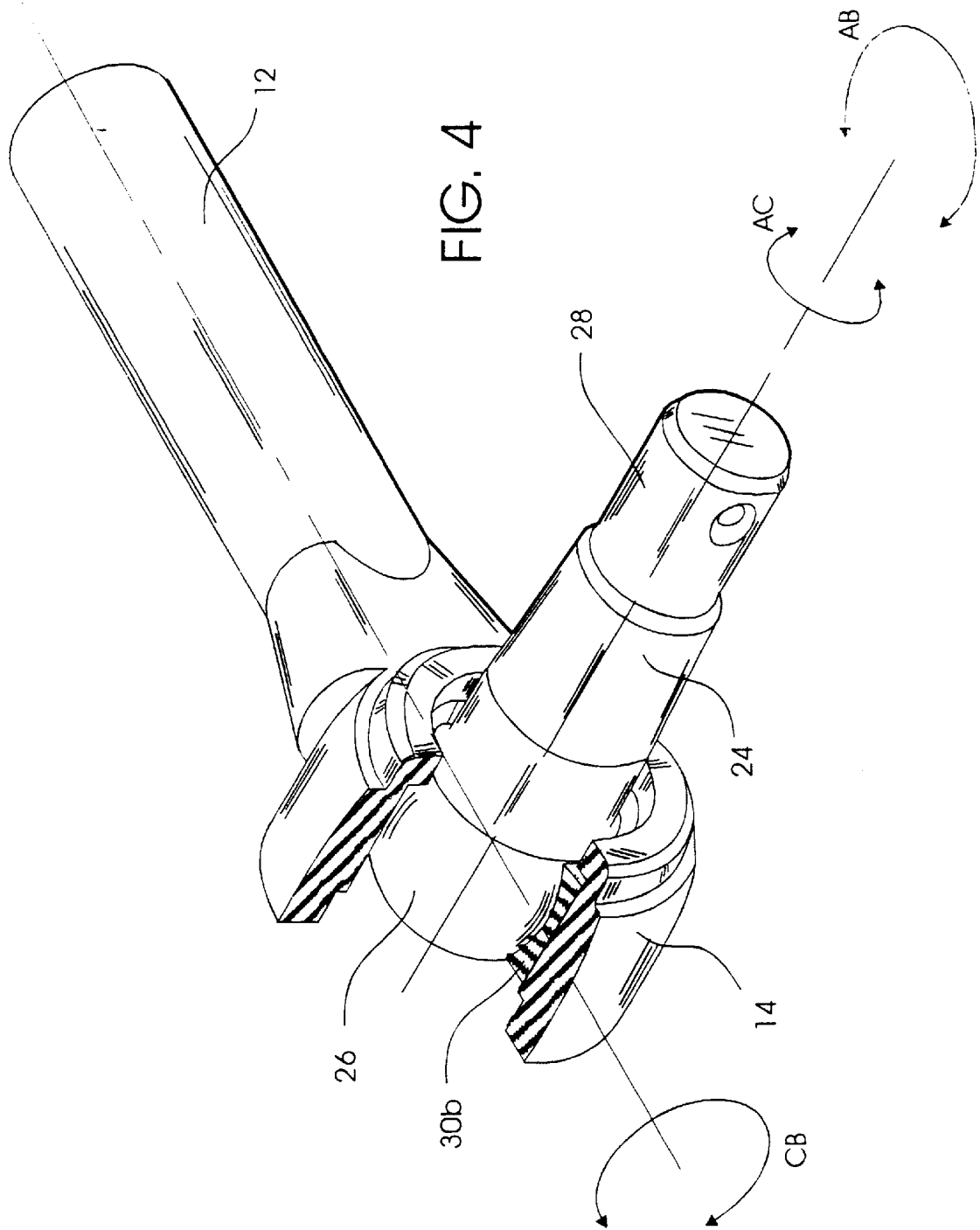
FIG. 4 is a partially cut bottom perspective view of the tie rod end of the present invention.

FIG. 4 shows plans AB, AC and CB on which project the functional motion components of tie rod end (10), described below:

AB: longitudinal oscillating motion of stud (24) to crosslink axis (12),

AC: rotative motion of stud (24) on its own axis.

CB: transverse oscillating motion of stud (24) to crosslink axis (12).

Once formed the coupling of tie rod end (10), as can be seen from FIG. 3; stud (24) ball (26) remains supported only by bearings (30a and 30b) and since the recesses (15) allow the bearings (30a and 30b) to slide relative axis B–B' and C–C' almost forming a transverse oscillating motion CB. These motions of the bearings (30a and 30b) allow the vibration produced in the tie rod end (10) be absorbed, thus reducing fractures on the tie rod ends, which are the purpose of this invention.

What is claimed is:

1. A tie rod end for a steering system comprising:

a crosslink axis, having a longitudinal axis, at least one end and a box portion, the box portion comprising two recesses perpendicular to the longitudinal axis; the recesses defining two housings, shaped as half-cubes;

a stud, comprising a stud ball, said stud coupled to the box portion by a coupling;

bearings disposed in the housings, each bearing having one of its faces being hemi-spherical;

the coupling comprising:

the bearings in the recesses of the box, the recesses have a width larger than the width of the bearings, such that the bearings may move relative to a first axis perpendicular to the longitudinal axis of the crosslink axis and a second axis perpendicular to the longitudinal axis of the crosslink axis and perpendicular to the first axis; and the stud contacting the hemi-spherical faces of the bearings;

wherein the bearings are of a greater thickness than the depth of the recesses, to allow the stud ball to remain concentric inside the box portion, without contacting any part of the box portion; and the stud ball is supported only by the bearings, the recesses allow the bearings to slide relative to the first and second axis to form a transverse oscillating rotation;

whereby the motion of the bearings allow the vibration produced in the tie rod end to be absorbed, thus reducing fractures on the tie rod end.

* * * * *